United States Patent
Hilbert et al.

(10) Patent No.: US 10,229,291 B2
(45) Date of Patent: *Mar. 12, 2019

(54) METHOD AND SYSTEM FOR CRYPTOGRAPHICALLY ENABLING AND DISABLING LOCKOUTS FOR CRITICAL OPERATIONS IN A SMART GRID NETWORK

(71) Applicant: Silver Spring Networks, Inc., Redwood City, CA (US)

(72) Inventors: Aditi Hilbert, Redwood City, CA (US); Michael St. Johns, Germantown, MD (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,081

(22) Filed: Jun. 12, 2017

(65) Prior Publication Data

US 2017/0277912 A1    Sep. 28, 2017

Related U.S. Application Data

(63) Continuation of application No. 14/321,223, filed on Jul. 1, 2014, now Pat. No. 9,747,469.

(Continued)

(51) Int. Cl.
*G06F 21/00* (2013.01)
*G06F 21/70* (2013.01)
(Continued)

(52) U.S. Cl.
CPC ............... *G06F 21/70* (2013.01); *G05F 1/66* (2013.01); *G06F 21/44* (2013.01); *G06F 21/6209* (2013.01); *Y04S 40/24* (2013.01)

(58) Field of Classification Search
CPC ...... G06F 21/70; G06F 21/30; G06F 21/6209; G06F 21/44; Y04S 40/24
See application file for complete search history.

(56) References Cited

U.S. PATENT DOCUMENTS

| | | | |
|---|---|---|---|
| 2002/0186838 A1 | 12/2002 | Brandys | |
| 2004/0099733 A1* | 5/2004 | Brookner | G07C 9/00309 235/382 |

(Continued)

OTHER PUBLICATIONS

Thorsteinson et al., The Idea behind Asymmetric Encryption, Dec. 19, 2003, 6 Pages.

(Continued)

*Primary Examiner* — Christopher C Harris
(74) *Attorney, Agent, or Firm* — Buchanan Ingersoll & Rooney PC

(57) ABSTRACT

A method for locking out a remote terminal unit includes: receiving a lockout request, wherein the lockout request includes at least a public key associated with a user, a user identifier, and a terminal identifier; identifying a user profile associated with the user based on the user identifier included in the received lockout request; verifying the public key included in the received lockout request and permission for the user to lockout a remote terminal unit associated with the terminal identifier included in the received lockout request based on data included in the identified user profile; generating a lockout permit, wherein the lockout permit includes at least the public key included in the received lockout request; and transmitting at least a lockout request and the generated lockout permit, wherein the lockout request includes an instruction to place a lockout on the remote terminal unit.

6 Claims, 7 Drawing Sheets

Related U.S. Application Data

(60) Provisional application No. 61/841,631, filed on Jul. 1, 2013.

(51) Int. Cl.
*G05F 1/66* (2006.01)
*G06F 21/44* (2013.01)
*G06F 21/62* (2013.01)

(56) References Cited

U.S. PATENT DOCUMENTS

| | | | |
|---|---|---|---|
| 2006/0059367 A1* | 3/2006 | Yarvis | G07C 9/00111 |
| | | | 713/189 |
| 2006/0242428 A1 | 10/2006 | Tarkkala | |
| 2007/0055889 A1 | 3/2007 | Henneberry | |
| 2008/0162930 A1 | 7/2008 | Finney | |
| 2010/0007513 A1 | 1/2010 | Horky | |

OTHER PUBLICATIONS

An Overview of Hardware Security Modules, Jim Attridge, Jan. 14, 2002, SANS Institute, 11 Pages.
Smart Card Concepts, Glenn Pittaway, Retreived from Wayback Machine date Jan. 12, 2009, Microsoft, 4 Pages.

* cited by examiner

METHOD AND SYSTEM FOR CRYPTOGRAPHICALLY ENABLING AND DISABLING LOCKOUTS FOR CRITICAL OPERATIONS IN A SMART GRID NETWORK

FIELD

The present disclosure relates to the enabling and disabling of lockouts on a remote terminal in a network, specifically the use of public and private keys in a three-entity system for enabling and disabling lockouts of terminal units in a network for the safety and protection of field personnel.

BACKGROUND

The performing of maintenance on power system networks can be dangerous to field personnel and others without proper precautions. Field personnel may often be working on, or closely to, elements that are regularly energized, and thus pose a great risk to the personnel and others nearby. As a result, such elements are often de-energized prior to work being performed, and re-energized after work has completed. In order to ensure that elements are de-energized and are not re-energized until all technicians are finished with their tasks and safe, traditional methods for locking out terminal units include field personnel physically placing locks that only they can unlock (e.g., via a special key or combination) on designated mechanisms in the terminal unit.

However, such methods are not without disadvantages. In some cases, it may be inconvenient for a technician to be physically on-site at a terminal unit that needs to be de-energized, particularly when work is performed elsewhere. This may result in an increased delay in services and a larger expenditure of resources. The use of physical locks on terminal units may also place the back office of the power network at a disadvantage, as they are unable to monitor the status of the work being performed and are unable to ensure that the proper elements are de-energized.

Thus, there is a need for a technical system to enable monitoring and management of lockouts of terminal units in a smart grid network in a back office system.

SUMMARY

The present disclosure provides a description of systems and methods for locking out remote terminal units and removing lockouts placed on remote terminal units.

A method for locking out a remote terminal unit includes: receiving, by a receiving device, a lockout request, wherein the lockout request includes at least a public key associated with a user, a user identifier, and a terminal identifier; identifying, by a processing device, a user profile associated with the user based on the user identifier included in the received lockout request; verifying, by the processing device, permission for the user to lockout a remote terminal unit associated with the terminal identifier included in the received lockout request based on data included in the identified user profile; generating, by the processing device, a lockout permit, wherein the lockout permit includes at least the public key included in the received lockout request; and transmitting, to the remote terminal unit, at least a lockout request and the generated lockout permit, wherein the lockout request includes an instruction to place a lockout on the remote terminal unit.

Another method for locking out a remote terminal unit includes: receiving, by a receiving device, at least a lockout request and a lockout permit, wherein the lockout permit includes at least a public key associated with a user; placing, by a processing device, a lockout on a remote terminal unit; generating, by the processing device, a lockout identifier associated with the remote terminal unit, and a lockout removal nonce; encrypting, by the processing device, the generated lockout removal nonce using the public key associated with the user; generating, by the processing device, a receipt including at least the generated lockout identifier and encrypted lockout removal nonce; and transmitting, by a transmitting device, the generated receipt in response to the received lockout request.

A method for removing a lockout from a remote terminal unit includes: receiving, by a receiving device, a lockout removal request, wherein the lockout removal request includes at least a lockout identifier associated with a lockout placed on a remote terminal unit, a user identifier associated with a user, and a decrypted lockout removal nonce; verifying, by a processing device, existence of the lockout placed on the remote terminal unit associated with the lockout identifier included in the received lockout removal request; verifying, by the processing device, permission for the user to remove the verified lockout placed on the remote terminal unit based on permission data corresponding to the user associated with the user identifier included in the received lockout removal request; generating, by the processing device, a lockout removal permit, wherein the lockout removal permit includes at least the lockout identifier and decrypted lockout removal nonce included in the received lockout removal request; and transmitting, to the remote terminal unit, at least a removal request and the generated lockout removal permit, wherein the removal request includes an instruction to remove the lockout associated with the lockout identifier.

Another method for removing a lockout from a remote terminal unit includes: receiving, by a receiving device, at least a lockout removal request and a lockout removal permit, wherein the lockout removal permit includes at least a lockout identifier associated with a lockout placed on a remote terminal unit and a decrypted lockout removal nonce; verifying, by a processing device, existence of the lockout placed on the remote terminal unit associated with the lockout identifier included in the received lockout removal permit; verifying, by the processing device, that the decrypted lockout removal nonce included in the received lockout removal permit matches a lockout removal nonce stored in the remote terminal unit and associated with the lockout identifier included in the received lockout removal permit; and removing, by the processing device, the lockout placed on the remote terminal unit associated with the lockout identifier included in the received lockout removal permit.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Cryptographically Enabling and Disabling Lockouts on Terminal Units

Figure 1:
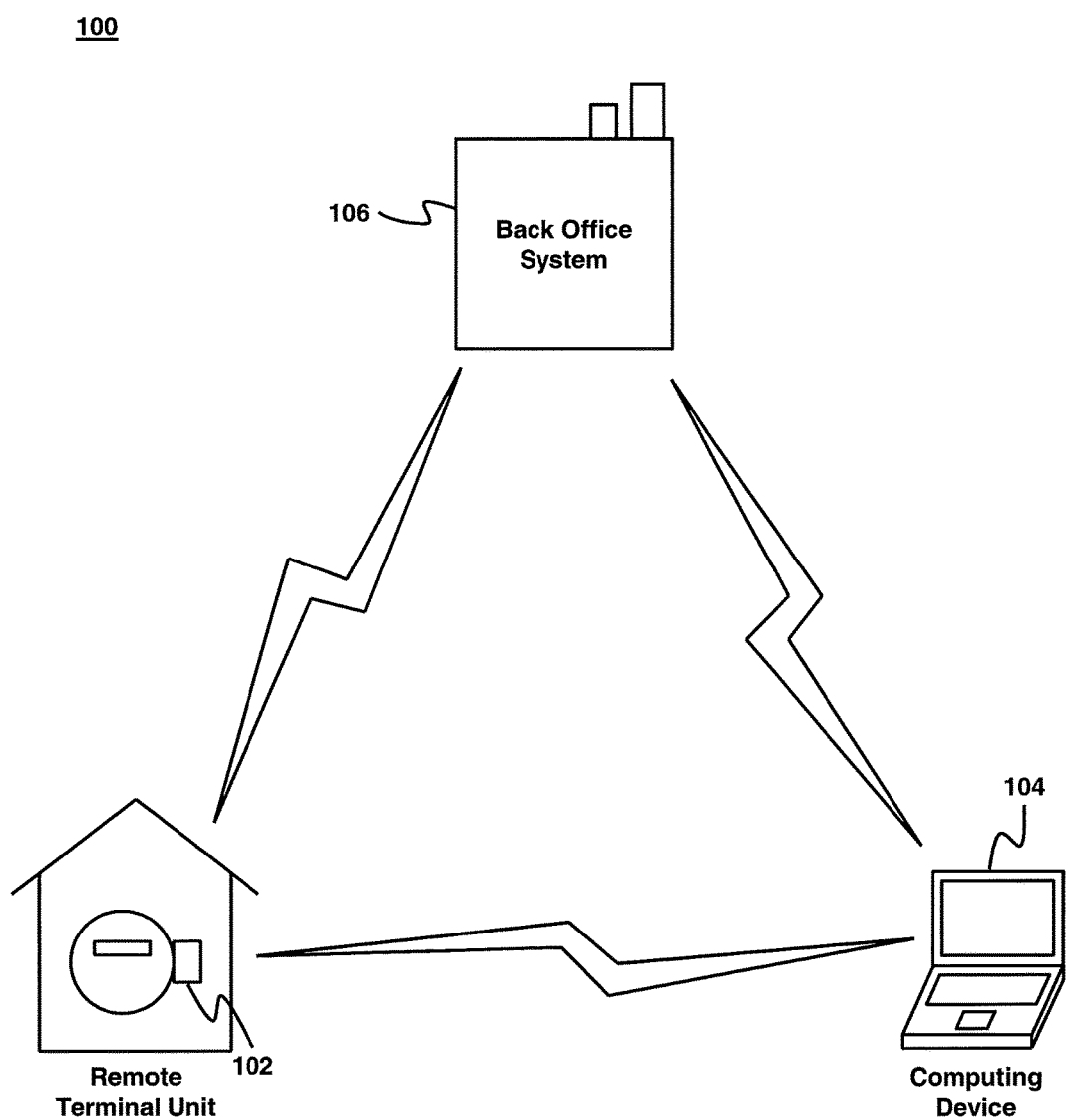
FIG. 1 is a high level architecture illustrating a system for the enabling and disabling of lockouts of remote terminal units in a smart grid network in accordance with exemplary embodiments.

FIG. 1 illustrates a system 100 for the enabling and disabling of lockouts on remote terminal units for operating in a critical operations mode using cryptographic commands.

The system 100 may include a remote terminal unit 102. The remote terminal unit 102 may be any type of device or node in a system or network suitable for performing the functions disclosed herein, as will be apparent to persons having skill in the relevant art. For example, if the system 100 is a power distribution system, the remote terminal unit 102 may be a unit in a substation that controls the input and/or output of power to and/or from the substation. The remote terminal unit 102 may include or be a part of a computing device configured to perform the functions disclosed herein, included via hardware, software, or a combination thereof, such as embedded in a power switch or, or the remote terminal unit 102 may be a separate, standalone computing device.

A field technician may receive a work order to perform work on one or more components of a network that includes the remote terminal unit 102 that may require de-energizing of one or more components controlled by the remote terminal unit 102. In such an instance, the field technician may require that a lockout be placed on the remote terminal unit 102 such that the remote terminal unit 102 will operate in a critical operations mode and de-energize the required components. In order to initiate the lockout procedure, the field technician may use a computing device 104 that is configured to communicate with the remote terminal unit 102.

The computing device 104 may be any type of computing device suitable for performing the functions disclosed herein, such as a laptop computer, notebook computer, tablet computer, smart phone, cellular phone, personal digital assistant, desktop computer, etc. In some instances, the computing device 104 may be a part of the remote terminal unit 102. In other instances, the computing device 104 may communicate with the remote terminal unit 102 using any suitable method that will be apparent to persons having skill in the relevant art, such as a local area network, wireless area network, near field communication, radio frequency communication, Bluetooth, the Internet, etc.

The field technician may input credentials into the computing device 104 to verify the field technician's identity. In some embodiments, credentials may be stored on a smart card or other suitable type of readable media that may be inserted into or otherwise read by the computing device 104. The credentials may include an asymmetric or other suitable type of key pair, including a public key and a private key. The field technician may use the computing device 104 to submit a request to lockout the remote terminal unit 102, with the request including at least the public key, information identifying the field technician, and information identifying the remote terminal unit 102 to be locked out.

Figure 2:
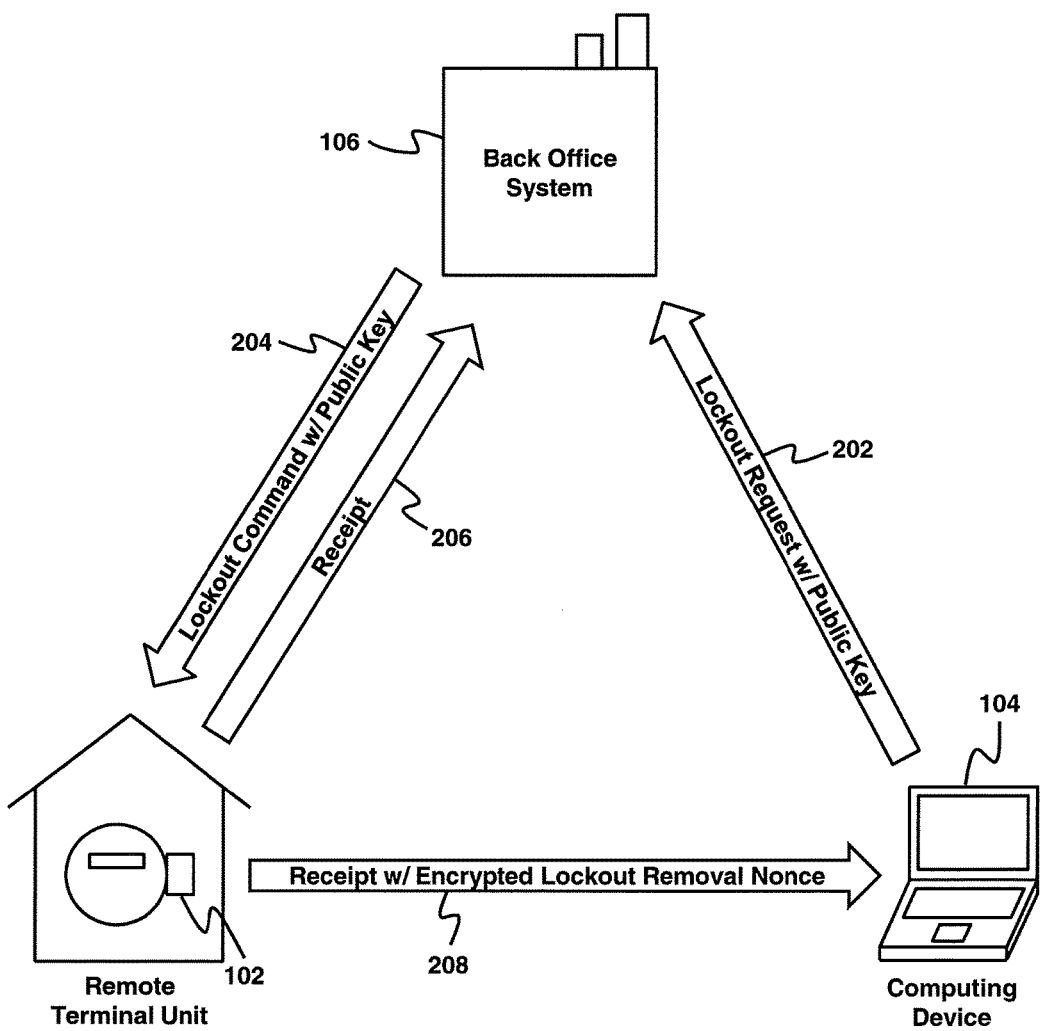
FIG. 2 is a flow diagram illustrating a process for locking out a remote terminal unit using the system of FIG. 1 in accordance with exemplary embodiments.

FIG. 2 is an illustration of a process for locking out the remote terminal unit 102, which may be initiated by the request submitted by the field technician via the computing device 104. As illustrated in step 202, the lockout request may be submitted from the computing device 104 to a back office system 106. The back office system 106 may be, in some embodiments, a computing system of a network operator or provider, such as, for example, a power utility in instances where the system 100 may be a power distribution system. The lockout request may include at least the public key associated with the field technician, such as read from the smart card inserted into the computing device 104 by the field technician. The request may be submitted to the back office system 106 via an established communication path between the computing device 104 and the back office system 106, such as via the Internet, a radio communication network, or other suitable communication method.

The back office system 106 may receive the request and may identify the field technician who submitted the request via the identification information included in the request, such as the public key or other identification information. The back office system 106 may then verify that the field technician is authorized to request a lockout of the remote terminal unit 102 specified in the request, such as by identifying a work order authorizing the work being performed by the field technician. If the field technician is authorized, the back office system 106 may generate a lockout permit that includes the field technician's public key, and may send the permit, along with a lockout request, to the remote terminal unit 102, in step 204.

The remote terminal unit 102 may receive the lockout request and the lockout permit via a communication path established between the back office system 106 and the remote terminal unit 102. In some instances, the communication path may be of the same communication type as the communication between the computing device 104 and the back office system 106 and/or remote terminal unit 102. In other instances, the communication path may be via a secure network that includes the back office system 106 and the remote terminal unit 102, such as a smart grid network.

The remote terminal unit 102 may receive the lockout request and may place a lockout on the remote terminal unit 102. As part of the placement of the lockout, the remote terminal unit 102 may verify the privileges of the field technician based on the public key included in the lockout permit and/or validate the lockout permit's public key as corresponding to the public key on the smart card inserted into the computing device 104. Placing of the lockout may include changing an operation mode of the remote terminal unit 102 to a critical operations mode, which may include de-energizing one or more energized circuits or components associated with the remote terminal unit 102. In some instances, the disconnect request may specify the components to be de-energized via the lockout. The critical operations mode may also include enabling remote management of a device, system, or one or more components thereof. The critical operations mode of the remote terminal unit 102 may be any type of operations mode where operation of one or more components included in, connected to, or in communication with the remote terminal unit 102 has been modified, changed, ceased, or otherwise affected by the placing of a lockout on the remote terminal unit 102. Once the lockout has been placed and the operations mode changed, the remote terminal unit 102 may transmit a receipt to the back office system 106, in step 206, informing the back office system 106 of the successful locking out of the remote terminal unit 102. As discussed in more detail below, the receipt may include a lockout identifier and an encrypted lockout removal nonce.

In some embodiments, the remote terminal unit 102 may also transmit, in step 208, a receipt confirming placement of the lockout to the computing device 104. In such an embodiment, the receipt may include the lockout identifier and/or encrypted lockout removal nonce. The computing device 104 may then display relevant information to the field technician, such as confirmation that the lockout has been placed and the required circuits de-energized, which may indicate that work can safely be performed.

Figure 3:
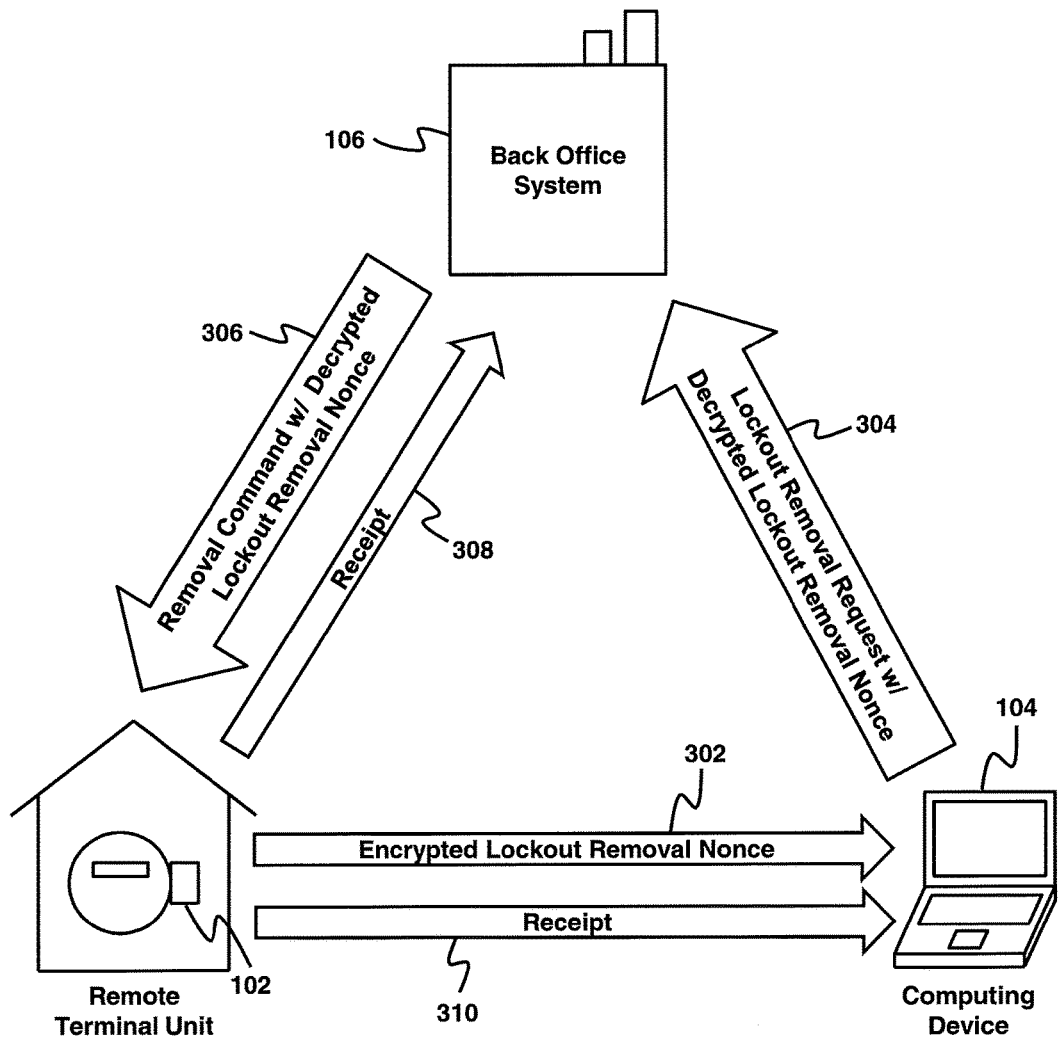
FIG. 3 is a flow diagram illustrating a process for removing a lockout on a remote terminal unit using the system of FIG. 1 in accordance with exemplary embodiments.

FIG. 3 is an illustration of a process of the system 100 for removing the lockout placed on the remote terminal unit 102.

As discussed in more detail below, as part of the placing of the lockout, the remote terminal unit 102 may generate a lockout identifier and an encrypted lockout removal nonce corresponding to the placed lockout. In step 302, the remote terminal unit 102 may transmit the encrypted lockout removal nonce to the computing device 104, which may decrypt the lockout removal nonce using the private key associated with the field technician, such as read by the computing device 104 from a smart card inserted into or otherwise read by the computing device 104 by the field technician. In step 304, the field technician may submit a lockout removal request to the back office system 106 using the computing device 104. The lockout removal request may include the lockout identifier and the decrypted lockout removal nonce.

As discussed in more detail below, once the request is received, the back office system 106 may verify that the lockout can be removed, and, if verified, may generate a lockout removal permit. The lockout removal permit may include the lockout identifier and decrypted lockout removal nonce. In step 306, the back office system 106 may transmit a lockout removal request along with the lockout removal permit to the remote terminal unit 102.

The remote terminal unit 102 may verify the lockout removal permit, as discussed in more detail below, and then may remove the lockout placed on the remote terminal unit 102 as a result of the received lockout removal request. Once all lockouts on the remote terminal unit 102 have been removed, the remote terminal unit 102 may change its operation mode to a normal operations mode, and may, in steps 308 and 310, send out receipts to the back office system 106 and computing device 104, respectively, indicating that the lockout has been removed, and, if applicable, that the operations mode has returned to normal. In instances where going into critical operations mode causes the remote terminal unit 102 to de-energize one or more circuits or components, returning to normal operations mode may consist of re-energizing the one or more circuits or components.

Methods for Placing a Lockout on a Remote Terminal Unit

Figure 4:
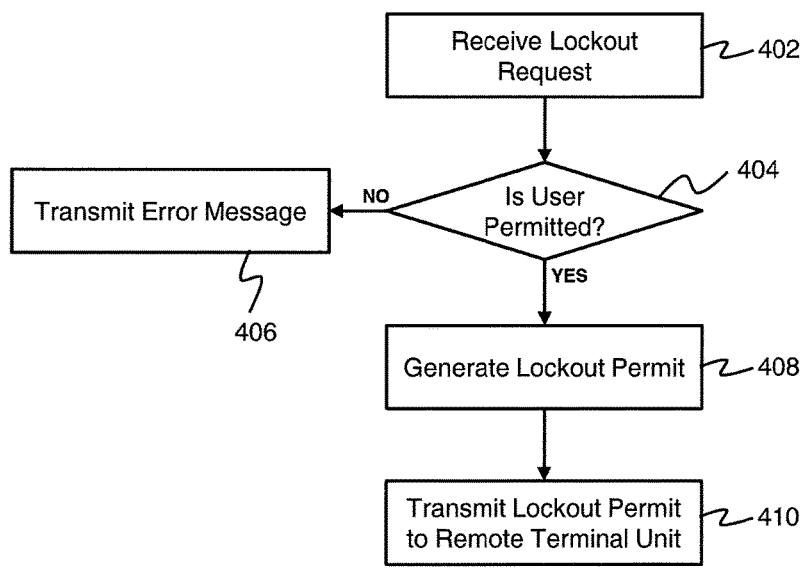
FIG. 4 is a flow chart illustrating a method for transmitting a command to lockout a remote terminal unit in accordance with exemplary embodiments.

FIG. 4 illustrates a method 400 for requesting a lockout be placed on the remote terminal unit 102 by the back office system 106.

In step 402, a receiving device of the back office system 106 may receive a lockout request from a field technician via the computing device 104. The lockout request may include at least a public key associated with the field technician or other user of the computing device 104, a user identifier, and a terminal identifier. The public key may be part of an asymmetric key pair, with the corresponding private key being stored in a smart card or other type of secure media that is inserted into or otherwise read by the computing device 104. The user identifier may be an identification number, username, or other value suitable for identifying a user profile associated with the field technician or other user of the computing device 104.

The terminal identifier may be an identification number, serial number, registration number, Internet Protocol address, media access control address, or other value suitable for identification of a remote terminal unit 102. The terminal identifier included in the lockout request may be associated with the remote terminal unit 102 for which the lockout is requested.

Once the lockout request has been received, in step 404 a processing device of the back office system 106 may determine if the field technician is permitted to request the lockout on the remote terminal unit 102. In some embodiments, step 404 may include identifying a profile associated with the field technician, such as by using the user identifier included in the lockout request. The processing unit may then verify that the public key included in the lockout request is associated with the field technician based on their profile, and may also verify the technician's permission to place a lockout on the remote terminal unit 102. Methods for verifying a user's permission to place a lockout will be apparent to persons having skill in the relevant art, and may include, for instance, determining existence of a work order for the field technician to work on one or more circuits that need to be de-energized via a lockout of the remote terminal unit 102.

If the processing unit of the back office system 106 determines that the field technician is not permitted to request the lockout, such as by failure to identify proper permission of the field technician, or if the public key included in the removal request is not the key assigned to the field technician, then, in step 406, a transmitting unit of the back office system 106 may transmit a message back to the computing device 104 indicating that the lockout cannot be placed. In some instances, the back office system 106 may also display and/or log a message regarding the failed lockout request, such as for security and/or monitoring reasons.

Figure 5:
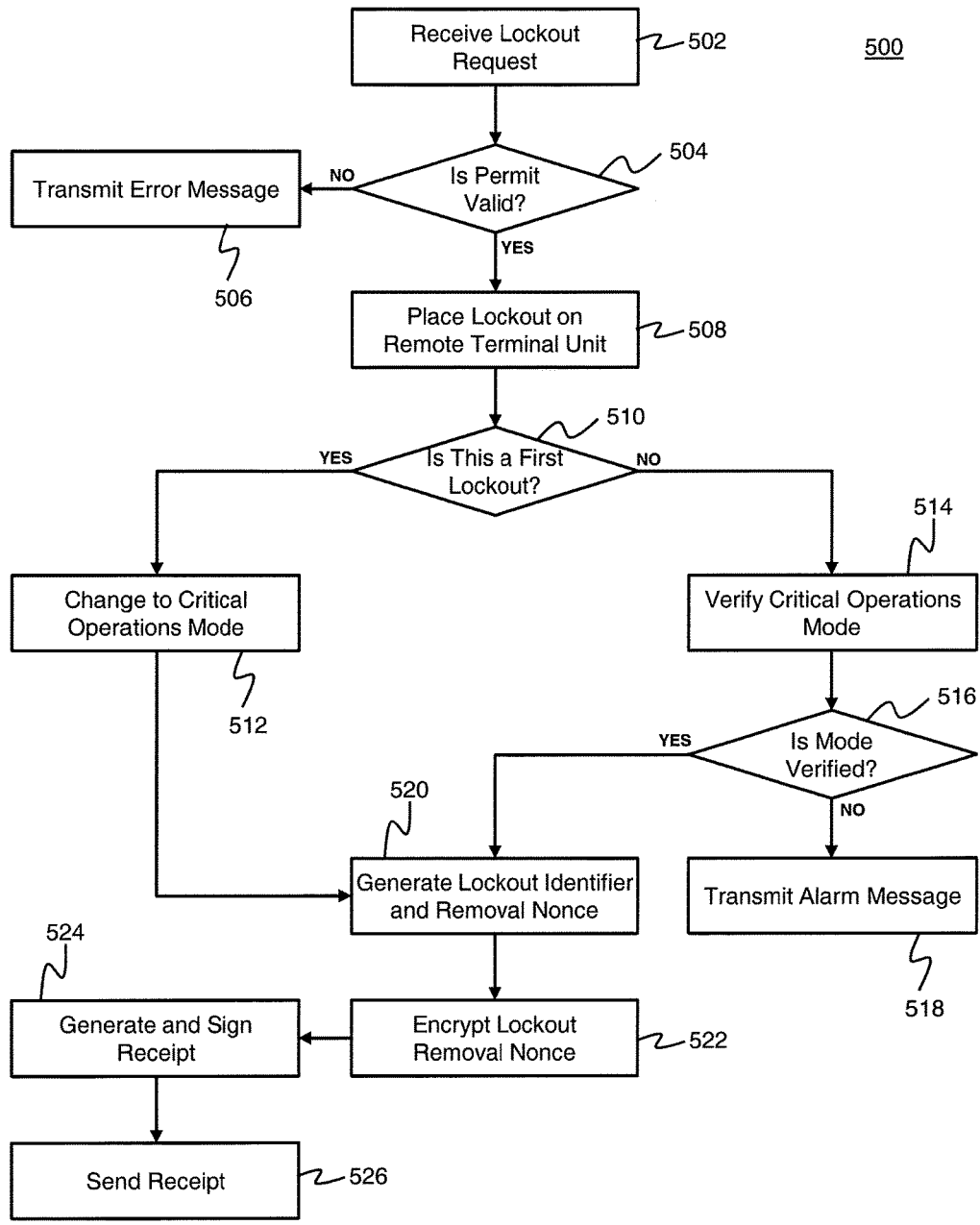
FIG. 5 is a flow chart illustrating a method for locking out a remote terminal unit based on a command received from a back office system in accordance with exemplary embodiments.

If the processing unit of the back office system 106 determines that the lockout request is valid and that the field technician is authorized, then, in step 408, the processing unit may generate a lockout permit. The lockout permit may include at least the public key associated with the field technician as received in the lockout request. In step 410, the lockout permit may be transmitted to the remote terminal unit 102 identified in the lockout request, and may be accompanied by a lockout request, configured to instruct the remote terminal unit 102 to place a lockout on the unit and operate in a critical operations mode. In some embodiments, the processing unit of the back office system 106 may sign the lockout permit and/or FIG. 5 illustrates a method 500 for the locking out of the remote terminal unit 102 based on receipt of the disconnect request submitted by the back office system 106.

In step 502, a receiving unit of the remote terminal unit 102 may receive the lockout request and accompanied lockout permit. In step 504, a processing unit of the remote terminal unit 102 may determine if the lockout permit is valid. Validation of the lockout permit may include comparing the public key included in the lockout permit with the public key stored in the smart card inserted into the computing device 104 by the field technician. In some instances, the processing unit of the remote terminal unit 102 may also validate the privileges of the field technician, such as based on data provided by the back office system 106, stored in the smart card used by the field technician, etc. Validation may also include verification of a signature used by the back office system 106 to sign the lockout permit. Additional methods of verification of a received permit will be apparent to persons having skill in the relevant art.

If the permit is determined to be invalid, then, in step 506, a transmitting unit of the remote terminal unit 102 may transmit a message back to the back office system 106 indicating that the received permit is invalid and that the lockout cannot be placed. In some embodiments, the remote terminal unit 102 may also transmit an error message to the computing device 104 to inform the field technician of the failed placement of the lockout. If the permit is determined to be valid, then, in step 508, the processing unit of the remote terminal unit 102 may place a lockout on the remote terminal unit 102. The lockout may be implemented in software and/or hardware of the remote terminal unit 102 and data based thereon stored therein in the remote terminal unit 102 using methods and systems that will be apparent to persons having skill in the relevant art. In some embodiments, the processing unit of the remote terminal unit 102 may maintain a counter of lockouts. In such an embodiment, step 508 may include the processing unit of the remote terminal unit 102 incrementing the counter as a result of placing the lockout.

In step 510, the processing unit of the remote terminal unit 102 may determine if the placed lockout is the first lockout placed on the remote terminal unit 102 at the present time, or if other lockouts are currently present. In instances where the processing unit may maintain a counter of placed lockouts, step 510 may include analyzing the counter to determine if the placed lockout is the first lockout on the remote terminal unit 102. If the lockout is the first lockout, then, in step 512, the processing unit may change the operation mode of the remote terminal unit 102 to a critical operations mode. Operation of the remote terminal unit 102 in critical operations mode may include the de-energizing of one or more energized circuits associated with the remote terminal unit 102. In some instances, the de-energized circuits and/or components may be based on data included in the received disconnect request and/or lockout permit. In some embodiments, the critical operations mode may provide remote management of a device, system, or component of a device or system that is associated with the remote terminal unit 102.

If the processing unit determined, in step 510, that there are one or more other lockouts currently in place on the remote terminal unit 102, then, in step 514, the processing unit of the remote terminal unit 102 may verify that the remote terminal unit 102 is already operating in critical operations mode, which may include verifying that the corresponding circuits and/or components are de-energized. In step 516, the processing unit may determine if the remote terminal unit 102 is behaving properly in the critical operations mode as a result of the verification.

If the remote terminal unit 102 is not properly operating in critical operations mode, then, in step 518, the transmitting unit of the remote terminal unit 102 may transmit an alarm message to the back office system 106, computing device 104, and/or any other suitable device (e.g., a mobile communication device possessed by a field technician associated with a lockout placed on the remote terminal unit 102), that indicates the failure of the remote terminal unit 102 to operate properly in critical operations mode. In some instances, the remote terminal unit 102 may immediately change operation into critical operations mode.

Once the lockout has been placed and the remote terminal unit 102 is operating in critical operations mode, then, in step 520, the processing unit of the remote terminal unit 102 may generate a lockout identifier and a lockout removal nonce. The lockout identifier may be an identification number or other value associated with the lockout placed on the remote terminal unit 102 as a response to the received disconnect request. The lockout removal nonce may be a nonce or other suitable cryptographic mechanism that may be used to ensure the proper and authorized removal of the placed lockout, as discussed in more detail below. It will be apparent to persons having skill in the relevant art that, in some instances, step 520 may be performed prior to steps 508 and/or steps 510.

In step 522, the processing unit of the remote terminal unit 102 may encrypt the lockout removal nonce using the public key included in the lockout permit and/or read from the smart card inserted into or read by the computing device 104. In step 524, the processing unit of the remote terminal unit 102 may generate and sign a receipt corresponding to the placed lockout, which may include the lockout identifier and the encrypted lockout removal nonce. In step 526, the transmitting unit of the remote terminal unit 102 may transmit the signed receipt that includes the lockout identifier and encrypted lockout removal nonce to the back office system 106 and/or the computing device 104.

Methods for Removing a Lockout Placed on a Remote Terminal Unit

Figure 6:
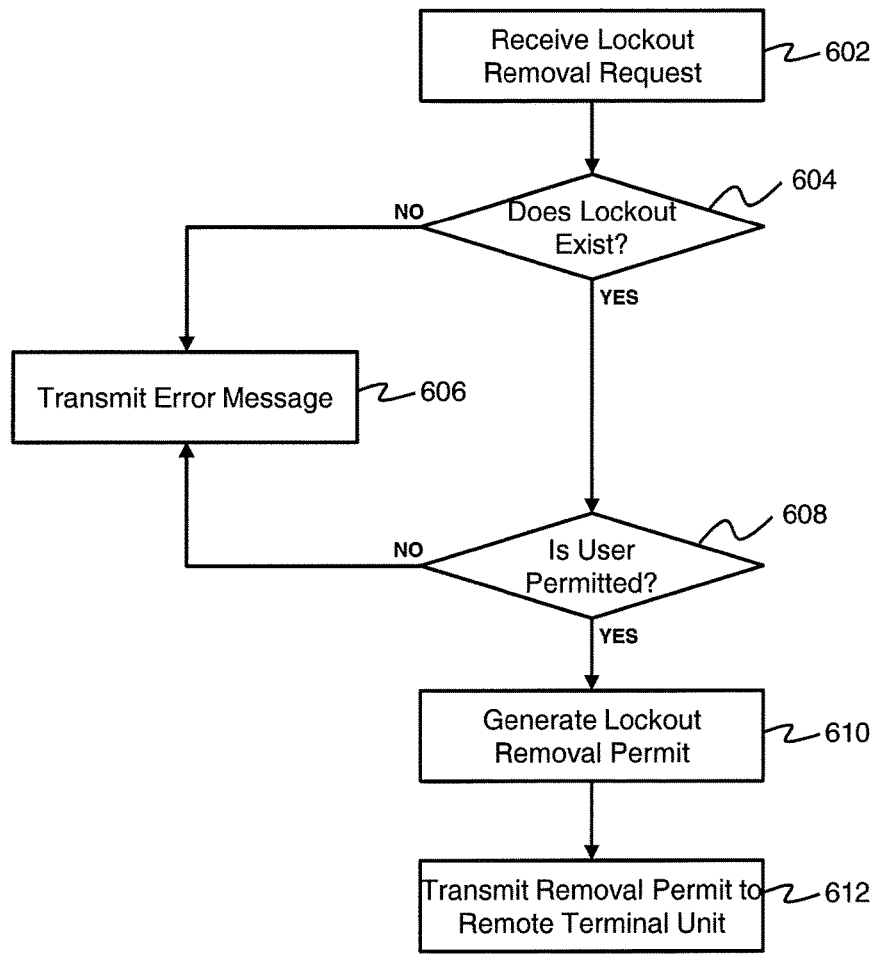
FIG. 6 is a flow chart illustrating a method for transmitting a command to remove a lockout on a remote terminal unit in accordance with exemplary embodiments.

FIG. 6 illustrates a method 600 for the requesting of removal of a lockout placed on a remote terminal unit 102 by the back office system 106.

In step 602, the receiving unit of the back office system 106 may receive a lockout removal request, such as submitted by the field technician via the computing device 104. The lockout removal request may include at least a lockout identifier associated with the lockout that is to be removed, a user identifier associated with the field technician requesting the lockout, and the decrypted lockout removal nonce. The lockout removal nonce may be the lockout removal nonce generated and encrypted by the remote terminal unit 102 that has been decrypted by the computing device 104 using the private key of the asymmetric key pair that is stored on a smart card inserted into or read by the computing device 104.

In step 604, the processing unit of the back office system 106 may determine if a lockout corresponding to the lockout identifier exists. The determination may include reviewing records stored by the back office system 106, such as from previously received receipts provided by the remote terminal unit 102, to determine if a lockout has previously been placed with the same lockout identifier that has not yet been removed. If no such currently placed lockout exists, then, in step 606, the transmitting unit of the back office system 106 may transmit an error message back to the computing device 104 indicating that no such lockout can be identified.

If a lockout matching the lockout identifier is determined to exist, then, in step 608, the processing unit may determine if the field technician is permitted to request removal of the lockout. The determination may be made similar to the determination if a field technician is requested to place a lockout, such as by identifying a profile associated with the field technician and determining if there is proper authorization and/or permissions for the field technician to remove the lockout. If the processing unit determines that the field technician is not permitted to remove the lockout, then the method 600 may return to step 606 where an error message may be transmitted to the computing device 104 to indicate that the lockout cannot be removed by the user.

If the processing unit determines that the field technician is permitted to remove the lockout, then, in step 610, the processing unit may generate a lockout removal permit. The lockout removal permit may include at least the lockout identifier and decrypted lockout removal nonce included in the received lockout removal request. In step 612, the transmitting unit of the back office system 106 may transmit the generated lockout removal permit along with a connect request to the remote terminal unit 102 corresponding to the terminal identifier included in the received lockout removal request.

Figure 7:
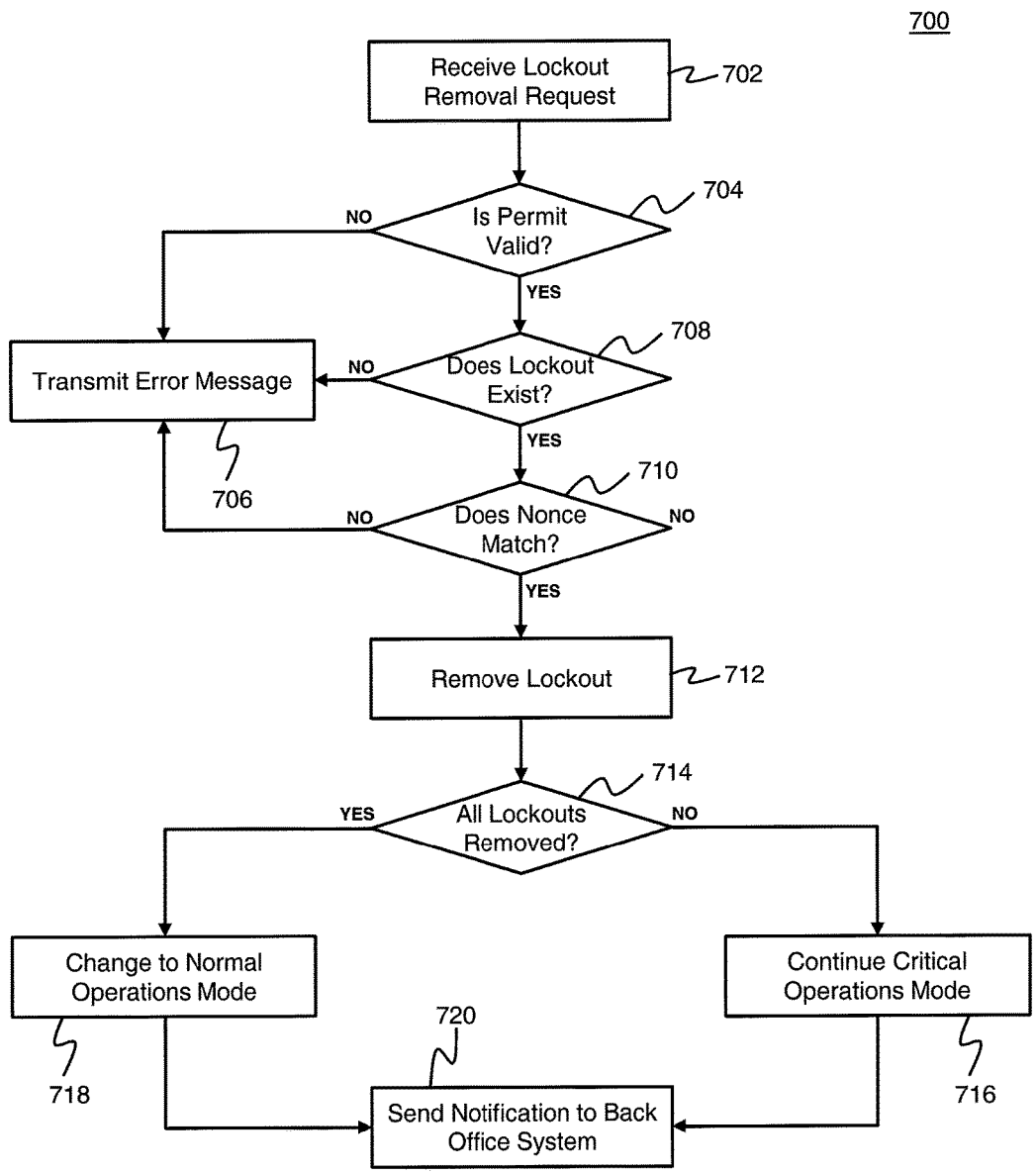
FIG. 7 is a flow chart illustrating a method for removing a lockout on a remote terminal unit based on a command received from a back office system in accordance with exemplary embodiments.

FIG. 7 illustrates a method 700 for removing the lockout placed on the remote terminal unit 102 as a response to the disconnect request received from the back office system 106.

In step 702, the receiving unit of the remote terminal unit 102 may receive the lockout removal request from the back office system 106. The lockout removal request may include and/or be accompanied by the lockout removal permit, which may include the lockout identifier and decrypted lockout removal nonce associated with the lockout to be removed. In step 704, the processing unit of the remote terminal unit 102 may determine if the lockout removal permit is valid. In some instances, the validation of the lockout removal permit may include verifying a signature on the permit, such as a cryptographic signature by the back office system 106 prior to transmitting the permit to the remote terminal unit 102. In some embodiments, the processing unit of the remote terminal unit 102 may also validate the privileges of the field technician to remove the lockout, such as based on data provided by the back office system 106, stored in the smart card used by the field technician, etc. Additional methods for verifying the validity of a permit will be apparent to persons having skill in the relevant art.

If the permit is determined to be invalid, then, in step 706, the transmitting unit of the remote terminal unit 102 may transmit an error message to the back office system 106 and/or the computing device 104 indicating that the permit is invalid and that the lockout can thereby not be removed. If the permit is determined to be valid, then, in step 708, the processing unit may determine if a lockout corresponding to the lockout identifier included in the remove lockout permit currently exists. If no such lockout exists, then the method 700 may proceed to step 706 and a corresponding error message transmitted out. If a corresponding lockout does exist, then, in step 710, the processing unit may determine if the decrypted lockout removal nonce matches the lockout to be removed.

Determining if the decrypted lockout removal nonce matches the lockout may include comparing the decrypted lockout removal nonce received in the lockout removal permit with the lockout removal nonce previously generated when the corresponding lockout was first placed. If the lockout removal nonces do not match, then the method 700 may proceed to step 706 and a corresponding error message transmitted out. If the lockout removal nonces match, then the method 700 may proceed to step 712.

In step 712, the processing unit of the remote terminal unit 102 may remove the lockout corresponding to the lockout identifier included in the lockout removal permit. In embodiments where the processing unit of the remote terminal unit 102 may maintain a counter of lockouts placed on the remote terminal unit 102, step 712 may include decrementing the counter upon removal of the lockout. In step 714, the processing unit may determine if removal of the lockout in step 712 means that all current lockouts on the remote terminal unit 102 have been removed. In embodiments with the counter, step 714 may include the processing unit of the remote terminal unit 102 analyzing the counter to determine if there are additional lockouts still on the remote terminal unit 102. If there are still lockouts placed on the remote terminal unit 102, then, in step 716, the remote terminal unit 102 may continue to operate in critical operations mode. If all lockouts have been removed, then, in step 718, the remote terminal unit 102 may return operations to the normal operations mode. In step 720, the transmitting unit of the remote terminal unit 102 may transmit a notification to the back office system 106 and/or computing device 104 that the lockout has been successfully removed and may include an indication of the current operating state of the remote terminal unit 102.

In some embodiments, the remote terminal unit 102 may include a hardware security module, smart card, or other similar secure processing hardware. In such an embodiment, the secure processing hardware may be configured to place or remove lockouts on the remote terminal unit 102. In such instances, the secure processing hardware may produce a physical signal that indicates the lockout state of the remote terminal unit 102 (e.g., indicating if a lockout is currently placed, such as based on an internal counter). The physical signal may be used by the remote terminal unit 102 to enable or disable the critical operations mode or remote management of the remote terminal unit 102 or a separate device. In some instances, the secure processing hardware may be located outside of the remote terminal unit 102 but be in communication with the remote terminal unit 102, such as a smart card inserted into the computing device 104.

By cryptographically placing and removing lockouts on the remote terminal unit 102, the system 100 may be able to ensure that lockouts are placed on remote terminal units more accurately and more effectively, which may also ensure a higher degree of safety for field technicians and other personnel. By requiring participation from both the field technician (e.g., via the computing device 104) and the back office, lockouts may not be placed or removed without the assistance of both parties, which may result in increased security. In addition, by allowing for multiple lockouts to be placed on a remote terminal unit 102, and by verifying the removal of each lockout prior to returning to a normal operations mode, the safety of field technicians can be greatly increased, as one technician may not unknowingly re-energize circuits that a second technician, who may be off-site, may be working on. Furthermore, by the back office system 106 monitoring the removal of lockouts, such a situation could be further prevented by monitoring by the back office system 106, despite any actions performed or requested by the field technician.

The use of the back office system 106 in initiating the placement or removal of lockouts may also result in increased efficiency of systems, including power distribution systems and smart grid networks. For example, because a lockout request goes to the back office system 106 prior to the remote terminal unit 102, and because the back office system 106 verifies the permission of the field technician to initiate the lockout, the back office can be sure that a field technician is working at the proper site and locking out the proper unit, and may be apprised of the times at which the technician is starting and/or stopping work, based on the lockout requests. As a result, the back office system 106 may be able to more closely monitor the work that is being performed, and may therefore operate at an increased efficiency compared to traditional systems for locking out remote terminal units 102.

Techniques consistent with the present disclosure provide, among other features, systems and methods for cryptographically enabling and disabling lockouts on remote terminal units. While various exemplary embodiments of the disclosed system and method have been described above it should be understood that they have been presented for purposes of example only, not limitations. They are not exhaustive and do not limit the disclosure to the precise form disclosed. Modifications and variations are possible in light of the above teachings or may be acquired from practicing of the disclosure, without departing from the breadth or scope.

What is claimed is:

1. A method for locking out a remote terminal unit, comprising:
    receiving, by a receiving device, at least a lockout request and a lockout permit, wherein the lockout permit includes at least a public key associated with a user;
    placing, by a processing device, a lockout on the remote terminal unit, wherein placing the lockout on the remote terminal unit includes changing an operation mode of the remote terminal unit;
    generating, by the processing device, a lockout identifier associated with the remote terminal unit, and a lockout removal nonce;
    encrypting, by the processing device, the generated lockout removal nonce using the public key associated with the user;
    generating, by the processing device, a receipt including at least the generated lockout identifier and encrypted lockout removal nonce; and
    transmitting, by a transmitting device, the generated receipt in response to the received lockout request, wherein
    the remote terminal unit continues to operate in the changed operation mode until the lockout is removed from the remote terminal unit, and
    the remote terminal unit is operable in the changed operation mode.

2. The method of claim 1, further comprising:
    receiving, by the receiving device, the public key associated with the user from a smart card inserted into a computing device in communication with the remote terminal unit.

3. The method of claim 1, wherein placing a lockout on the remote terminal unit includes de-energizing one or more energized circuits associated with the remote terminal unit.

4. The method of claim 1, further comprising:
    if the lockout associated with the generated lockout identifier is a first lockout placed on the remote terminal unit, de-energizing one or more energized circuits associated with the remote terminal unit; and
    if the lockout associated with the generated lockout identifier is a second or subsequent lockout placed on the remote terminal unit, verifying that the one or more circuits associated with remote terminal unit are de-energized.

5. The method of claim 1, wherein the processing device includes a hardware security module or smart card configured to perform at least the placing step.

6. The method of claim 5, wherein the hardware security module or smart card is configured to produce a physical signal after completion of the placing step, the physical signal being used to change the operation mode of the remote terminal unit.

* * * * *